(12) United States Patent
Alluboyina et al.

(10) Patent No.: US 11,108,638 B1
(45) Date of Patent: Aug. 31, 2021

(54) HEALTH MONITORING OF AUTOMATICALLY DEPLOYED AND MANAGED NETWORK PIPELINES

(71) Applicant: Robin Systems, Inc., San Jose, CA (US)

(72) Inventors: Ravi Kumar Alluboyina, Santa Clara, CA (US); Sree Nandan Atur, Newark, CA (US); Kapil Upadhayay, Bangalore (IN); Pragash Vijayaragavan, San Jose, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/896,094

(22) Filed: Jun. 8, 2020

(51) Int. Cl.
H04L 12/24 (2006.01)

(52) U.S. Cl.
CPC ...... *H04L 41/0893* (2013.01); *H04L 41/0654* (2013.01); *H04L 41/082* (2013.01); *H04L 41/145* (2013.01)

(58) Field of Classification Search
None
See application file for complete search history.

(56) References Cited

U.S. PATENT DOCUMENTS

| | | | |
|---|---|---|---|
| 3,715,573 A | 2/1973 | Vogelsberg | |
| 4,310,883 A | 1/1982 | Clifton | |
| 5,602,993 A | 2/1997 | Stromberg | |
| 5,680,513 A | 10/1997 | Hyland | |
| 5,796,290 A * | 8/1998 | Takahashi | G01K 7/01 307/651 |
| 6,014,669 A * | 1/2000 | Slaughter | G06F 16/275 707/610 |
| 6,052,797 A * | 4/2000 | Ofek | G06F 11/2064 709/219 |
| 6,119,214 A * | 9/2000 | Dirks | G06F 12/10 711/159 |
| 6,157,963 A * | 12/2000 | Courtright, II | G06F 3/061 710/40 |

(Continued)

FOREIGN PATENT DOCUMENTS

WO WO2017008675 1/2017

OTHER PUBLICATIONS

Segment map, GOOGLE, Feb. 4, 2019.
(Continued)

*Primary Examiner* — Backhean Tiv
(74) *Attorney, Agent, or Firm* — David R. Stevens; Stevens Law Group

(57) ABSTRACT

Deployment of a network service pipeline may be automated by defining workflows comprising functions of instances of elements. Workflows may be defined in a graphical user interface including menus for the selection of elements, functions, and predefined workflows. A workflow may be dynamic such that addition or modification of a function invokes a trigger that automatically populates or modifies parameters of the functions of the workflow. Elements may each have a same set of functions that may be invoked by an orchestrator to perform automated implementation of the workflow. Functions of a workflow may be implemented in batches and may retrieve executable. data from a distributed file store. A test platform with hardware and network simulation may be used to develop functions and workflows.

20 Claims, 12 Drawing Sheets

(56) References Cited

U.S. PATENT DOCUMENTS

| | | | |
|---|---|---|---|
| 6,161,191 A * | 12/2000 | Slaughter | G06F 11/1423 709/201 |
| 6,298,478 B1 * | 10/2001 | Nally | G06F 9/466 717/170 |
| 6,301,707 B1 | 10/2001 | Carroll | |
| 6,311,193 B1 | 10/2001 | Sekido | |
| 6,851,034 B2 | 2/2005 | Challenger | |
| 6,886,160 B1 * | 4/2005 | Lee | G06F 16/27 717/173 |
| 6,895,485 B1 * | 5/2005 | DeKoning | G06F 3/0605 711/114 |
| 6,957,221 B1 * | 10/2005 | Hart | G06F 11/2097 |
| 7,096,465 B1 * | 8/2006 | Dardinski | G05B 19/0426 717/121 |
| 7,111,055 B2 * | 9/2006 | Falkner | G06F 8/61 709/221 |
| 7,171,659 B2 * | 1/2007 | Becker | H04L 29/06 709/217 |
| 7,246,351 B2 * | 7/2007 | Bloch | G06F 8/61 715/700 |
| 7,305,671 B2 * | 12/2007 | Davidov | G06F 8/30 717/108 |
| 7,461,374 B1 * | 12/2008 | Balint | G06F 8/658 717/174 |
| 7,535,854 B2 * | 5/2009 | Luo | H04L 12/2898 370/254 |
| 7,590,620 B1 | 9/2009 | Pike | |
| 7,698,698 B2 | 4/2010 | Skan | |
| 7,721,283 B2 | 5/2010 | Kovachka | |
| 7,734,859 B2 | 6/2010 | Daniel | |
| 7,738,457 B2 | 6/2010 | Nordmark | |
| 7,779,091 B2 | 8/2010 | Wilkinson | |
| 7,797,693 B1 | 9/2010 | Gustafson | |
| 7,984,485 B1 | 7/2011 | Rao | |
| 8,037,471 B2 | 10/2011 | Keller | |
| 8,046,450 B1 | 10/2011 | Schloss | |
| 8,060,522 B2 | 11/2011 | Birdwell | |
| 8,121,874 B1 | 2/2012 | Guheen | |
| 8,171,141 B1 | 5/2012 | Offer | |
| 8,219,821 B2 | 7/2012 | Zimmels | |
| 8,250,033 B1 | 8/2012 | De Souter | |
| 8,261,295 B1 | 9/2012 | Risbood | |
| 8,326,883 B2 | 12/2012 | Pizzorni | |
| 8,392,498 B2 | 3/2013 | Berg | |
| 8,429,346 B1 | 4/2013 | Chen | |
| 8,464,241 B2 | 6/2013 | Hayton | |
| 8,505,003 B2 | 8/2013 | Bowen | |
| 8,527,544 B1 | 9/2013 | Colgrove | |
| 8,601,467 B2 | 12/2013 | Hofhansl | |
| 8,620,973 B1 | 12/2013 | Veeraswamy | |
| 8,639,989 B1 * | 1/2014 | Sorenson, III | G06F 11/2082 714/47.2 |
| 8,666,933 B2 | 3/2014 | Pizzorni | |
| 8,745,003 B1 | 6/2014 | Patterson | |
| 8,775,751 B1 | 7/2014 | Pendharkar | |
| 8,782,632 B1 | 7/2014 | Chigurapati | |
| 8,788,634 B2 | 7/2014 | Krig | |
| 8,832,324 B1 | 9/2014 | Hodges | |
| 8,886,806 B2 | 11/2014 | Tung | |
| 8,909,885 B2 | 12/2014 | Corbett | |
| 8,954,383 B1 | 2/2015 | Vempati | |
| 8,954,568 B2 | 2/2015 | Krishnan | |
| 8,966,198 B1 | 2/2015 | Harris | |
| 9,009,542 B1 * | 4/2015 | Marr | H04L 43/0817 714/47.3 |
| 9,116,731 B2 * | 8/2015 | Tung | G06F 9/5072 |
| 9,134,992 B2 | 9/2015 | Wong | |
| 9,146,769 B1 | 9/2015 | Shankar | |
| 9,148,465 B2 | 9/2015 | Gambardella | |
| 9,152,337 B2 | 10/2015 | Kono | |
| 9,167,028 B1 | 10/2015 | Bansal | |
| 9,280,591 B1 | 3/2016 | Kharatishvili | |
| 9,330,155 B1 | 5/2016 | Bono | |
| 9,336,060 B2 | 5/2016 | Nori | |
| 9,342,444 B2 | 5/2016 | Minckler | |
| 9,354,907 B1 * | 5/2016 | Teli | G06F 9/45533 |
| 9,367,301 B1 | 6/2016 | Serrano | |
| 9,390,128 B1 | 7/2016 | Seetala | |
| 9,436,693 B1 | 9/2016 | Lockhart | |
| 9,514,160 B2 | 12/2016 | Song | |
| 9,521,198 B1 | 12/2016 | Agarwala | |
| 9,569,274 B2 | 2/2017 | Tarta | |
| 9,569,480 B2 | 2/2017 | Provencher | |
| 9,590,872 B1 * | 3/2017 | Jagtap | H04L 41/145 |
| 9,600,193 B2 | 3/2017 | Ahrens | |
| 9,613,119 B1 | 4/2017 | Aron | |
| 9,619,389 B1 | 4/2017 | Roug | |
| 9,635,132 B1 | 4/2017 | Lin | |
| 9,667,470 B2 | 5/2017 | Prathipati | |
| 9,747,096 B2 | 8/2017 | Searlee | |
| 9,870,366 B1 | 1/2018 | Duan | |
| 9,880,933 B1 | 1/2018 | Gupta | |
| 9,892,265 B1 | 2/2018 | Tripathy | |
| 9,929,916 B1 | 3/2018 | Subramanian | |
| 9,998,955 B1 | 6/2018 | MacCarthaigh | |
| 10,019,459 B1 | 7/2018 | Agarwala | |
| 10,042,628 B2 | 8/2018 | Thompson | |
| 10,061,520 B1 * | 8/2018 | Zhao | G06F 3/0673 |
| 10,133,619 B1 * | 11/2018 | Nagpal | G06F 11/0787 |
| 10,191,778 B1 * | 1/2019 | Yang | G06Q 30/0283 |
| 10,241,774 B2 * | 3/2019 | Spivak | H04L 67/34 |
| 10,282,229 B2 * | 5/2019 | Wagner | G06F 9/5038 |
| 10,353,634 B1 * | 7/2019 | Greenwood | G06F 3/0619 |
| 10,430,434 B2 | 10/2019 | Sun | |
| 10,498,608 B2 * | 12/2019 | Sethi | H04L 43/10 |
| 10,560,328 B2 * | 2/2020 | Mohanram | H04L 43/0823 |
| 10,623,285 B1 * | 4/2020 | Shevade | H04L 43/0817 |
| 10,630,598 B1 * | 4/2020 | Kowalski | H04L 43/067 |
| 10,657,119 B1 | 5/2020 | Acheson | |
| 10,754,720 B2 * | 8/2020 | Mahindru | G06F 11/008 |
| 10,761,915 B2 * | 9/2020 | Mahindru | G06F 11/2257 |
| 10,776,482 B2 * | 9/2020 | Gan | G06F 11/3409 |
| 10,956,246 B1 | 3/2021 | Bagde | |
| 2002/0141390 A1 | 10/2002 | Fangman | |
| 2004/0010716 A1 | 1/2004 | Childress | |
| 2004/0153703 A1 | 8/2004 | Vigue | |
| 2004/0221125 A1 | 11/2004 | Ananthanarayanan | |
| 2005/0065986 A1 | 3/2005 | Bixby | |
| 2005/0216895 A1 | 9/2005 | Tran | |
| 2005/0256948 A1 | 11/2005 | Hu | |
| 2006/0025908 A1 * | 2/2006 | Rachlin | G05B 23/0251 701/31.4 |
| 2006/0053357 A1 * | 3/2006 | Rajski | G01R 31/2846 714/742 |
| 2006/0085674 A1 * | 4/2006 | Ananthamurthy | G06F 11/1088 714/6.12 |
| 2006/0259686 A1 * | 11/2006 | Sonobe | G06F 3/061 711/114 |
| 2007/0006015 A1 | 1/2007 | Rao | |
| 2007/0016786 A1 | 1/2007 | Waltermann | |
| 2007/0067583 A1 | 3/2007 | Zohar | |
| 2007/0165625 A1 | 7/2007 | Eisner | |
| 2007/0260842 A1 | 11/2007 | Faibish | |
| 2007/0277056 A1 | 11/2007 | Varadarajan | |
| 2007/0288791 A1 | 12/2007 | Allen | |
| 2008/0010421 A1 | 1/2008 | Chen | |
| 2008/0068899 A1 | 3/2008 | Ogihara | |
| 2008/0189468 A1 | 8/2008 | Schmidt | |
| 2008/0235544 A1 | 9/2008 | Lai | |
| 2008/0263400 A1 | 10/2008 | Waters | |
| 2008/0270592 A1 | 10/2008 | Choudhary | |
| 2008/0288940 A1 * | 11/2008 | Adams | G06F 9/45558 718/1 |
| 2009/0144497 A1 * | 6/2009 | Withers | G06F 3/064 711/114 |
| 2009/0172335 A1 * | 7/2009 | Kulkarni | G06F 11/1068 711/170 |
| 2009/0240809 A1 * | 9/2009 | La Frese | G06F 9/505 709/226 |
| 2009/0254701 A1 * | 10/2009 | Kurokawa | G06F 3/0604 711/112 |
| 2009/0307249 A1 * | 12/2009 | Koifman | G06F 3/0659 |

(56) References Cited

U.S. PATENT DOCUMENTS

| | | | |
|---|---|---|---|
| 2010/0100251 A1* | 4/2010 | Chao | G21C 17/00 700/292 |
| 2010/0153781 A1* | 6/2010 | Hanna | H04L 67/02 714/37 |
| 2010/0161941 A1* | 6/2010 | Vyshetsky | G06F 13/1605 712/205 |
| 2010/0162233 A1 | 6/2010 | Ku | |
| 2010/0211815 A1 | 8/2010 | Mankovskii | |
| 2010/0274984 A1 | 10/2010 | Inomata | |
| 2010/0299309 A1 | 11/2010 | Maki | |
| 2010/0306495 A1 | 12/2010 | Kumano | |
| 2010/0332730 A1 | 12/2010 | Royer | |
| 2011/0083126 A1 | 4/2011 | Bhakta | |
| 2011/0119664 A1 | 5/2011 | Kimura | |
| 2011/0188506 A1 | 8/2011 | Arribas | |
| 2011/0208928 A1 | 8/2011 | Chandra | |
| 2011/0246420 A1 | 10/2011 | Wang | |
| 2011/0276951 A1 | 11/2011 | Jain | |
| 2012/0005557 A1 | 1/2012 | Mardiks | |
| 2012/0066449 A1 | 3/2012 | Colgrove | |
| 2012/0102369 A1 | 4/2012 | Hiltunen | |
| 2012/0216052 A1 | 8/2012 | Dunn | |
| 2012/0226667 A1 | 9/2012 | Volvovski | |
| 2012/0240012 A1 | 9/2012 | Weathers | |
| 2012/0259819 A1 | 10/2012 | Patwardhan | |
| 2012/0265976 A1 | 10/2012 | Spiers | |
| 2012/0303348 A1 | 11/2012 | Lu | |
| 2012/0311671 A1 | 12/2012 | Wood | |
| 2012/0331113 A1 | 12/2012 | Jain | |
| 2013/0054552 A1 | 2/2013 | Hawkins | |
| 2013/0054932 A1 | 2/2013 | Acharya | |
| 2013/0080723 A1 | 3/2013 | Sawa | |
| 2013/0254521 A1* | 9/2013 | Bealkowski | G06F 9/445 713/2 |
| 2013/0282662 A1 | 10/2013 | Kumarasamy | |
| 2013/0297802 A1* | 11/2013 | Laribi | H04L 47/80 709/226 |
| 2013/0332688 A1 | 12/2013 | Corbett | |
| 2013/0339659 A1 | 12/2013 | Bybell | |
| 2013/0346709 A1 | 12/2013 | Wang | |
| 2014/0006465 A1 | 1/2014 | Davis | |
| 2014/0047263 A1 | 2/2014 | Coatney | |
| 2014/0047341 A1 | 2/2014 | Breternitz | |
| 2014/0047342 A1 | 2/2014 | Breternitz | |
| 2014/0058871 A1 | 2/2014 | Marr | |
| 2014/0059527 A1 | 2/2014 | Gagliardi | |
| 2014/0059528 A1 | 2/2014 | Gagliardi | |
| 2014/0108483 A1 | 4/2014 | Tarta | |
| 2014/0130040 A1 | 5/2014 | Lemanski | |
| 2014/0149696 A1* | 5/2014 | Frenkel | G06F 9/45558 711/162 |
| 2014/0195847 A1 | 7/2014 | Webman | |
| 2014/0245319 A1 | 8/2014 | Fellows | |
| 2014/0281449 A1 | 9/2014 | Christopher | |
| 2014/0282596 A1 | 9/2014 | Bourbonnais | |
| 2015/0046644 A1 | 2/2015 | Karp | |
| 2015/0067031 A1 | 3/2015 | Acharya | |
| 2015/0074358 A1 | 3/2015 | Flinsbaugh | |
| 2015/0112951 A1 | 4/2015 | Narayanamurthy | |
| 2015/0134857 A1 | 5/2015 | Hahn | |
| 2015/0149605 A1 | 5/2015 | de la Iglesia | |
| 2015/0186217 A1 | 7/2015 | Eslami | |
| 2015/0278333 A1 | 10/2015 | Hirose | |
| 2015/0317212 A1 | 11/2015 | Lee | |
| 2015/0326481 A1 | 11/2015 | Rector | |
| 2015/0379287 A1 | 12/2015 | Mathur | |
| 2016/0011816 A1 | 1/2016 | Aizman | |
| 2016/0026667 A1* | 1/2016 | Mukherjee | G06F 16/278 707/714 |
| 2016/0042005 A1* | 2/2016 | Liu | G06F 9/455 711/103 |
| 2016/0124775 A1* | 5/2016 | Ashtiani | G06F 9/5022 718/104 |
| 2016/0197995 A1* | 7/2016 | Lu | H04L 67/1097 709/219 |
| 2016/0239412 A1* | 8/2016 | Wada | G06F 12/0246 |
| 2016/0259597 A1* | 9/2016 | Worley | G06F 3/0613 |
| 2016/0283261 A1 | 9/2016 | Nakatsu | |
| 2016/0321091 A1* | 11/2016 | Cropper | H04L 41/0893 |
| 2016/0357456 A1 | 12/2016 | Iwasaki | |
| 2016/0357548 A1 | 12/2016 | Stanton | |
| 2016/0366185 A1* | 12/2016 | Lee | H04L 9/3236 |
| 2016/0373327 A1 | 12/2016 | Degioanni | |
| 2017/0033995 A1* | 2/2017 | Banka | H04L 41/0893 |
| 2017/0034023 A1* | 2/2017 | Nickolov | H04L 43/0817 |
| 2017/0060710 A1 | 3/2017 | Ramani | |
| 2017/0060975 A1 | 3/2017 | Akyureklier | |
| 2017/0139645 A1 | 5/2017 | Byun | |
| 2017/0149843 A1 | 5/2017 | Amulothu | |
| 2017/0168903 A1 | 6/2017 | Dornemann | |
| 2017/0192889 A1 | 7/2017 | Sato | |
| 2017/0214550 A1 | 7/2017 | Kumar | |
| 2017/0235649 A1 | 8/2017 | Shah | |
| 2017/0242617 A1 | 8/2017 | Walsh | |
| 2017/0242719 A1 | 8/2017 | Tsirkin | |
| 2017/0244557 A1 | 8/2017 | Riel | |
| 2017/0244787 A1 | 8/2017 | Rangasamy | |
| 2017/0322954 A1 | 11/2017 | Horowitz | |
| 2017/0337492 A1 | 11/2017 | Chen | |
| 2017/0371551 A1 | 12/2017 | Sachdev | |
| 2018/0006896 A1 | 1/2018 | MacNamara | |
| 2018/0024889 A1 | 1/2018 | Verma | |
| 2018/0046553 A1 | 2/2018 | Okamoto | |
| 2018/0082053 A1 | 3/2018 | Brown | |
| 2018/0107419 A1 | 4/2018 | Sachdev | |
| 2018/0113625 A1 | 4/2018 | Sancheti | |
| 2018/0113770 A1 | 4/2018 | Hasanov | |
| 2018/0136931 A1 | 5/2018 | Hendrich | |
| 2018/0137306 A1 | 5/2018 | Brady | |
| 2018/0150306 A1 | 5/2018 | Govindaraju | |
| 2018/0159745 A1 | 6/2018 | Byers | |
| 2018/0165170 A1 | 6/2018 | Hegdal | |
| 2018/0218000 A1 | 8/2018 | Setty | |
| 2018/0225140 A1* | 8/2018 | Titus | G06F 11/2023 |
| 2018/0225216 A1 | 8/2018 | Filippo | |
| 2018/0246670 A1 | 8/2018 | Baptist | |
| 2018/0246745 A1 | 8/2018 | Aronovich | |
| 2018/0247064 A1 | 8/2018 | Aronovich | |
| 2018/0276215 A1 | 9/2018 | Chiba | |
| 2018/0285164 A1* | 10/2018 | Hu | G06F 9/5016 |
| 2018/0285223 A1* | 10/2018 | McBride | G06F 11/1662 |
| 2018/0285353 A1* | 10/2018 | Rao | G06F 9/45558 |
| 2018/0287883 A1* | 10/2018 | Joshi | G06F 9/45558 |
| 2018/0302335 A1 | 10/2018 | Gao | |
| 2018/0329981 A1 | 11/2018 | Gupte | |
| 2018/0364917 A1 | 12/2018 | Ki | |
| 2018/0375728 A1 | 12/2018 | Gangil | |
| 2019/0065061 A1* | 2/2019 | Kim | G06F 3/0631 |
| 2019/0065323 A1* | 2/2019 | Dhamdhere | G06F 11/3452 |
| 2019/0073132 A1* | 3/2019 | Zhou | G06F 3/0688 |
| 2019/0073372 A1* | 3/2019 | Venkatesan | G06F 12/0253 |
| 2019/0079928 A1 | 3/2019 | Kumar | |
| 2019/0089651 A1 | 3/2019 | Pignataro | |
| 2019/0102226 A1 | 4/2019 | Caldato | |
| 2019/0109756 A1* | 4/2019 | Lebdeh | G06F 9/5077 |
| 2019/0116690 A1 | 4/2019 | Chen | |
| 2019/0148932 A1* | 5/2019 | Benesch | H02H 7/0833 361/85 |
| 2019/0156023 A1* | 5/2019 | Gerebe | H04L 9/3226 |
| 2019/0163460 A1* | 5/2019 | Kludy | G06F 8/63 |
| 2019/0188094 A1* | 6/2019 | Ramamoorthi | G06F 11/2023 |
| 2019/0190803 A1 | 6/2019 | Joshi | |
| 2019/0199601 A1 | 6/2019 | Lynar | |
| 2019/0213085 A1 | 7/2019 | Alluboyina | |
| 2019/0215313 A1 | 7/2019 | Doshi | |
| 2019/0220266 A1 | 7/2019 | Doshi | |
| 2019/0220315 A1 | 7/2019 | Vallala | |
| 2019/0235895 A1 | 8/2019 | Ovesea | |
| 2019/0250849 A1 | 8/2019 | Compton | |
| 2019/0272205 A1 | 9/2019 | Jiang | |
| 2019/0278624 A1 | 9/2019 | Bade | |
| 2019/0324666 A1 | 10/2019 | Kusters | |

(56) References Cited

U.S. PATENT DOCUMENTS

| | | | |
|---|---|---|---|
| 2019/0334727 A1 | 10/2019 | Kaufman | |
| 2019/0361748 A1* | 11/2019 | Walters | G06F 9/5061 |
| 2019/0369273 A1 | 12/2019 | Liu | |
| 2020/0019414 A1 | 1/2020 | Byard | |
| 2020/0026635 A1* | 1/2020 | Gaber | G06F 11/3433 |
| 2020/0034193 A1 | 1/2020 | Jayaram | |
| 2020/0034254 A1 | 1/2020 | Natanzon | |
| 2020/0050522 A1* | 2/2020 | Coleman | G06F 11/203 |
| 2020/0083909 A1 | 3/2020 | Kusters | |
| 2020/0110650 A1* | 4/2020 | Hu | G06F 9/30007 |
| 2020/0150977 A1 | 5/2020 | Wang | |
| 2020/0162330 A1* | 5/2020 | Vadapalli | H04L 41/0886 |
| 2020/0257519 A1* | 8/2020 | Shen | G06F 8/65 |
| 2020/0356537 A1 | 11/2020 | Sun | |
| 2020/0412625 A1* | 12/2020 | Bagarolo | H04L 41/145 |
| 2021/0042151 A1 | 2/2021 | Muller | |
| 2021/0067607 A1 | 3/2021 | Gardner | |
| 2021/0126839 A1* | 4/2021 | Rudrachar | H04L 41/16 |
| 2021/0157622 A1* | 5/2021 | Ananthapur Bache | H04L 41/0893 |
| 2021/0168034 A1* | 6/2021 | Qian | H04L 41/22 |

OTHER PUBLICATIONS

Fast and Secure Append-Only storage with Infinite Capacity, Zheng, Aug. 27, 2003.
User Mode and Kernel Mode, MICROSOFT, Apr. 19, 2017.
Precise memory leak detection for java software using container profiling, XU, Jul. 2013.
Mogi et al., "Dynamic Parity Stripe Reorganizations for RAID5 Disk Arrays," 1994, IEEE, pp. 17-26.
Syed et al., "The Container Manager Pattern", ACM, pp. 1-9 (Year 2017).
Rehmann et al., "Performance of Containerized Database Management Systems", ACM, pp. 1-6 (Year 2018).
Awada et al.," Improving Resource Efficiency of Container-instance Clusters on Clouds", IEEE, pp. 929-934 (Year 2017).
Stankovski et al., "Implementing Time- Critical Functionalities with a Distributed Adaptive Container Architecture", ACM, pp. 1-5 (Year 2016).
Dhakate et al., "Distributed Cloud Monitoring Using Docker as Next Generation Container Virtualization Technology" IEEE, pp. 1-5 (Year 2015).
Crameri et al., "Staged Deployment in Mirage, an Integrated Software Upgrade Testing and Distribution System", ACM, pp. 221-236 (Year: 2007).
Cosmo et al., "Packages Upgrades in FOSS Distributions: Details and Challenges", AC 2008).
Burg et al., "Atomic Upgrading of Distributed Systems", ACM, pp. 1-5 (Year: 2008).
Souer et al., "Component Based Architecture forWeb Content Management: Runtime Deployable Web Manager Component Bundles", IEEE, pp. 366-369 (Year: 2008).
Weingartner et al., "A distributed autonomic management framework for cloud computing orchestration." In 2016 IEEE World Congress on Services (Year: 2016).

\* cited by examiner

HEALTH MONITORING OF AUTOMATICALLY DEPLOYED AND MANAGED NETWORK PIPELINES

RELATED APPLICATIONS

This application is related to U.S. application Ser. No. 16/888,600 filed May 29, 2020, U.S. application Ser. No. 16/903,266 filed Jun. 16, 2020, U.S. application Ser. No. 16/915,878 filed Jun. 29, 2020, U.S. application Ser. No. 17/061,500 filed Oct. 1, 2020, and U.S. application Ser. No. 17/089,579 filed Nov. 4, 2020, which are incorporated herein by reference for all purposes.

BACKGROUND

Field of the Invention

This invention relates to automating the deployment and management of network applications.

Background of the Invention

In order to deliver a network service to a consumer, such as on a mobile device of a consumer, there are many applications, networking configurations, and other actions that are required to implement the network service, access the data managed by the network service, and to interact with a client application that interacts with the user. In many instances, these actions must be performed at many different data centers that are distributed geographically.

It would be an advancement in the art to facilitate the development and deployment of network services.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
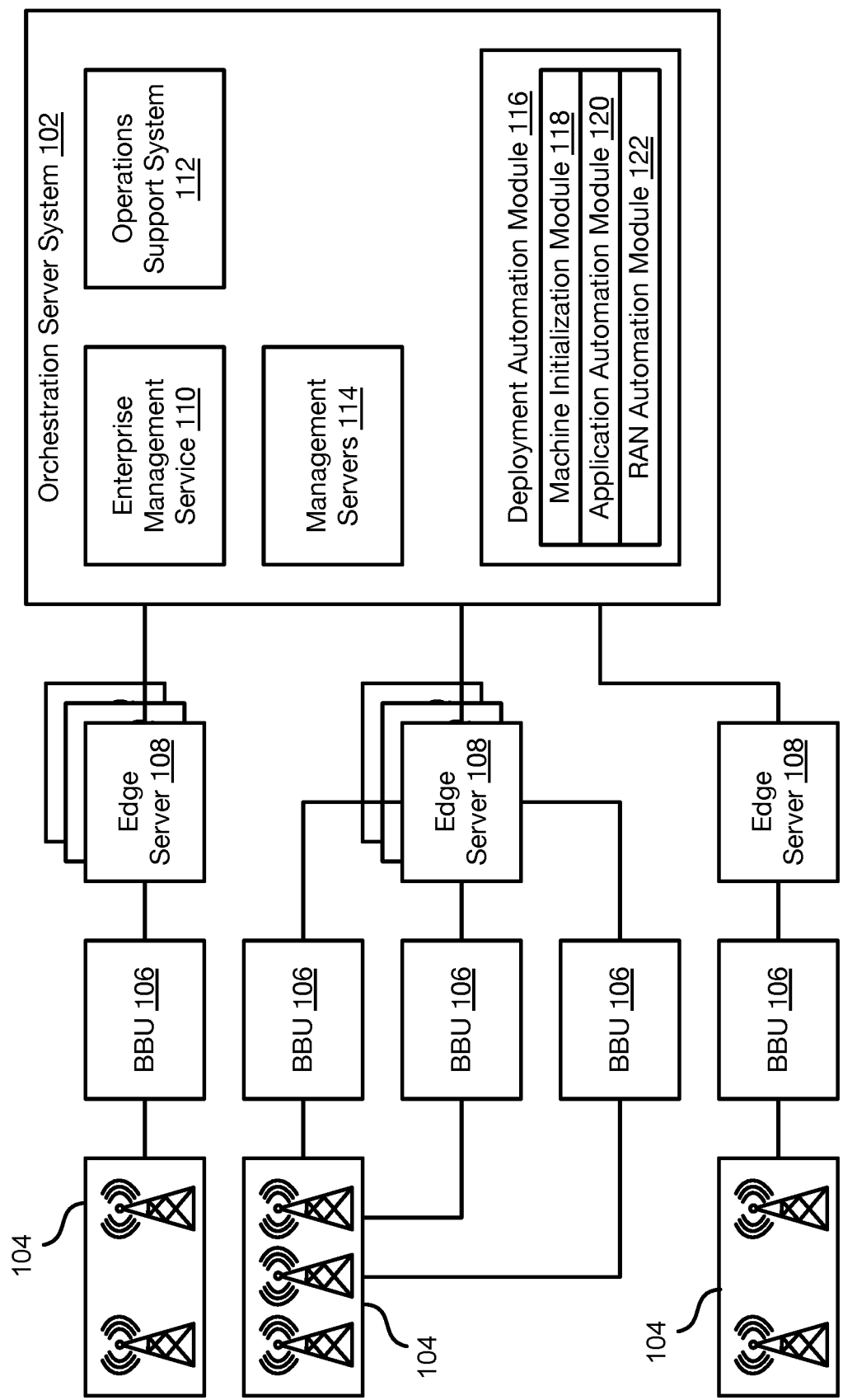
FIG. 1 is a schematic block diagram of a components of a network service and an orchestration server system in accordance with an embodiment of the present invention.

FIG. 1 illustrates an example network environment 100 in which the systems and methods disclosed herein may be used. In particular, an orchestration server system 102 may execute on one or more server computers and implement the systems and methods disclosed herein in order to implement a network service by way of one or more radio antennas 104, such antennas 104 may be configured to communicated wireless signals according to a cellular wireless data protocol (e.g., 4G, 5G, etc.) for implementing a network service to mobile devices of users.

The radio antennas 104 may be coupled to baseband units (BBU) 106 that provides translation between radio frequency signals output and received by the antennas 104 and digital data transmitted and received by edge servers 108 coupled to the antennas 104. For example, each BBU 106 may perform this translation according to any of the cellular wireless data protocols mentioned above. The edge servers 108 may be coupled to the orchestration server system 102 either directly or by way of one or more intermediary servers.

The orchestration server system 102 may implement centralized management services used to manage the edge servers 108 and BBUs 106. For example, these may include enterprise management services 110, operations support systems (OSS) 112, and one or more management servers 114 for services implemented on the edge servers 108.

The orchestration server system 102 may implement a deployment automation module 116 that facilitates deployment of the BBUs 106, edge servers 108, services executing on the BBUs 106 and edge servers 108, and centralized management services implemented by the orchestration server system 102 or other server system 102.

For example, this may include a machine initialization module 118 that detects hardware such as the computing devices implementing BBUs 106 or edge servers 108 and initializes them to receive installation of services. For example, given a computing device configured with an IP address, the machine initialization module 118 may initialize the BIOS (basic input output system), install an operating system, configure the operating system to connect to a network and to the orchestration server system 102, and install an agent for facilitating installation of services and for performing management functions on the computing device at the instruction of the deployment automation module 116. For example, the machine initialization module 118 may use COBBLER in order to initialize the computing device.

The machine initialization module 118 may also discover computing devices on a network and generate a topology of the devices, such as in the form of a directed acyclic graph (DAG). The deployment automation module 116 may then use this DAG to select computing devices for implementing network services and in order to configure a machine to receive installation of a network service.

The deployment automation module 116 may include an application automation module 120 that automates the deployment of an application, such as a container executing an application, on a computing device. The application automation module 120 may implement methods and systems described below relating to the automated deployment and management of applications.

One example application of the systems and methods disclosed herein is a radio area network (RAN) automation module 122 that performs the automated deployment of a network service in the illustrated network environment, including instantiating, configuring, and managing services executing on the BBUs 106, edge servers 108, and orchestration server system 102 in order to implement a RAN in a one-click automated fashion.

Figure 2:
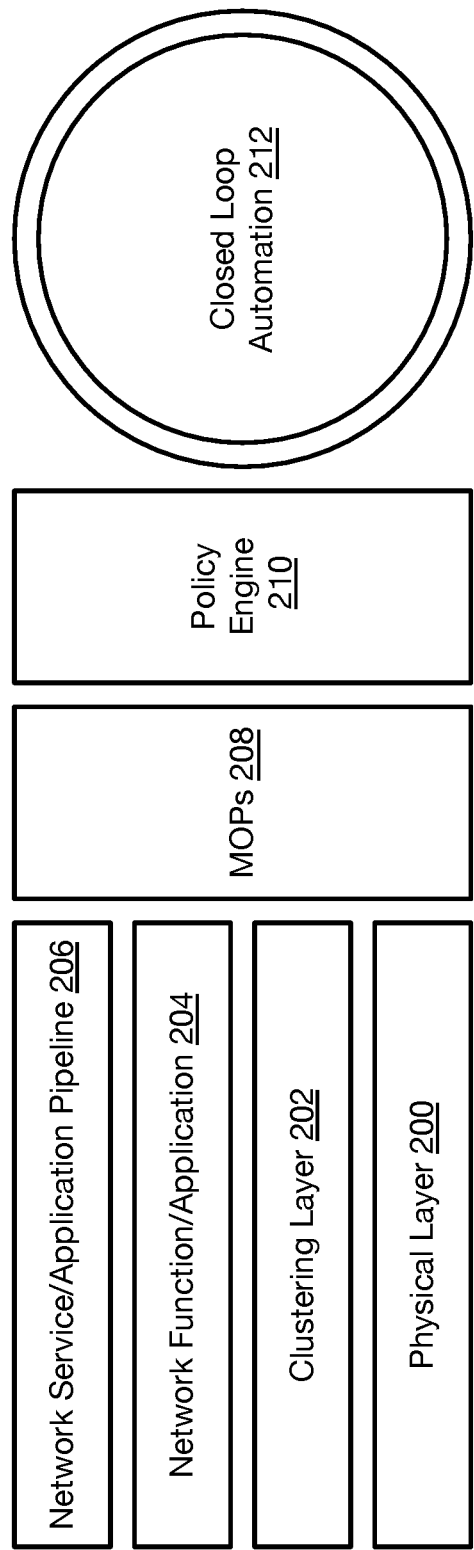
FIG. 2 is a schematic block diagram of layers and external management functions of a network service in accordance with an embodiment of the present invention.

FIG. 2 is a schematic block diagram of layers and external management functions of a network service in accordance with an embodiment of the present invention. At the base, is a physical layer 200 including hardware of a computing device. The physical layer 200 may also include basic software such as BIOS, firmware, operating system, or even a virtual machine executing on the computing device.

A clustering layer 202 resides on the physical layer 200 and includes data structures and software that enables a group of computing devices to act as a cluster. A cluster may be defined as a group of devices that are backups of one another, that provide a service with requests for that service being distributed among devices of the cluster according to a load balancing approach, that together implement a plurality of distinct applications that cooperate with one another to implement a service, or that are associated to one another for a common purpose or according to an arbitrary cluster definition of an administrator. The clustering layer 202 may be implemented by agent software executing on the physical layer 200 that coordinates with the deployment automation module 116 and other devices of a cluster to implement a cluster.

The network function/application layer 204 includes applications executing on the computing devices of a cluster that individually or together with other applications executing on other nodes of the cluster implement a network service, such as access to a database, web server, or other server-based computational function that may be provided as a service to a user or another service of a network environment 100.

A network service/application pipeline layer 206 may include a pipeline of network functions/applications 204 that communicate with one another to implement a more complex network service.

Operations of any of the layers 200-206 may be managed by method and procedures (MOPs) 208 that are independent of the services implemented by the layers and include management functions such as instantiating, upgrading, health checks, monitoring power, restarting, replacing, scaling, and shutting down of the entities implementing a layer 200-26 (also referred to as life cycle management (LCM)).

A policy engine 210 may likewise operate with respect to any of the layers 200-206 and provide logic defining actions performed with respect to some or all of the layers 200-206, such as procedures for implementing backups, handling faults at a particular layer, prioritization of individual MOPs 208, or other policies that an administrator may wish to impose on the operation of any of the layers 200-206.

For example, the policy engine 210 may have access to a topology of an application pipeline created according to the methods disclosed herein. Error messages received from elements of the pipeline may be received and aggregated in chronological order, such as using the approach described in U.S. application Ser. No. 16/561,994 filed Sep. 5, 2019, and entitled Performing Root Cause Analysis in a Multi-Role Application, which is hereby incorporated herein by reference in its entirety. Once a fault is identified, the policy engine 210 may implement an appropriate recovery policy. For example, if a computing device fails, its IP address may be released and assigned to a new computing device. The elements on the failed computing device may be instantiated on a new computing device assigned the IP address. If an element fails, a new element of the same type may be instantiated and configured to take its place. If a pod fails, a new pod may be created and configured to take its place.

Closed loop automation 212 may also be implemented with respect to some or all of the layers. Closed loop automation 212 may include the performance of tasks, verification of performance of tasks, monitoring function, automated actions performed in response to states detected during monitoring, and other actions in order to implement some or all of the layers 200-206 and maintain operation of the layers 200-206.

Figure 3:
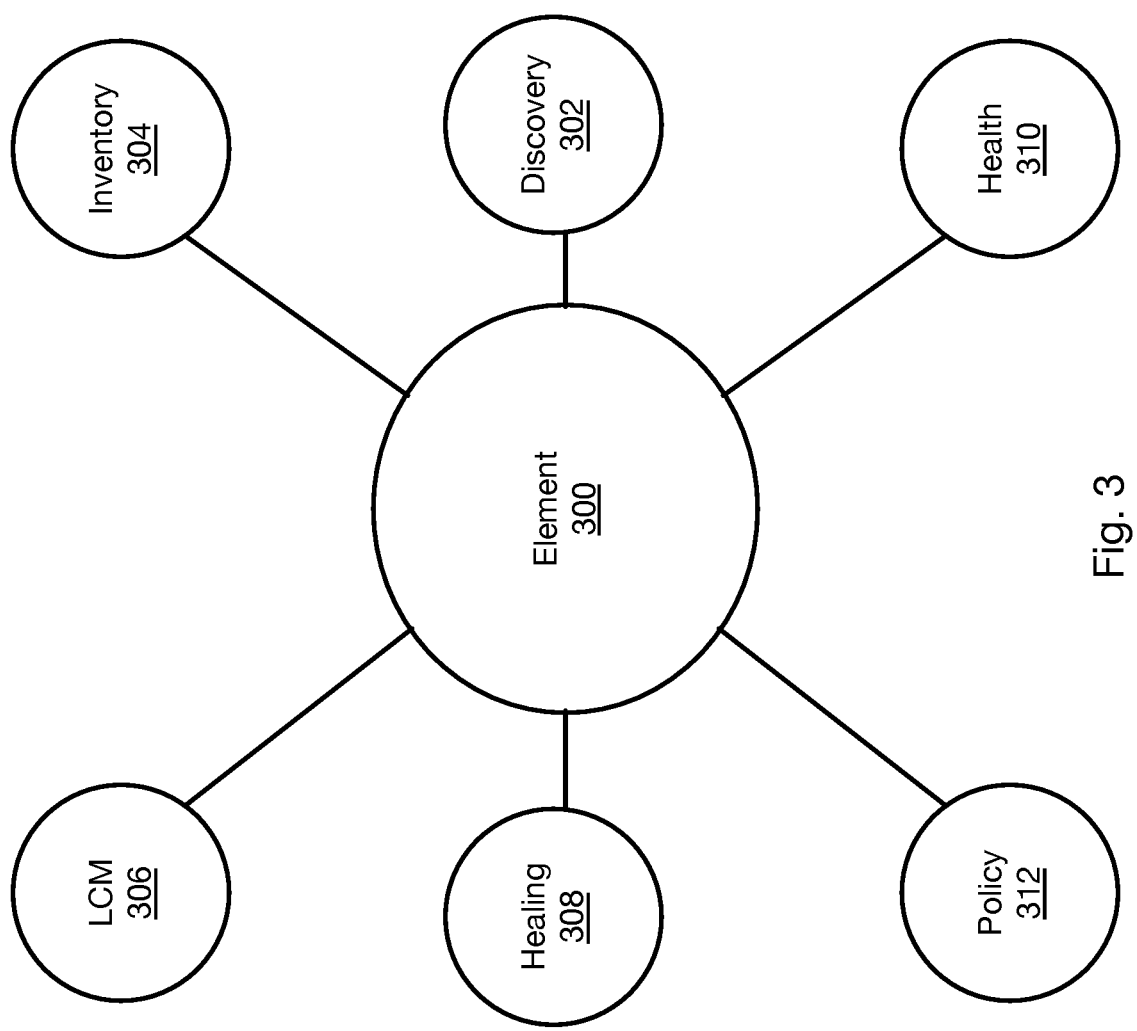
FIG. 3 is a schematic diagram of an element of a network service in accordance with an embodiment of the present invention.

FIG. 3 is a schematic diagram of an element 300 of a network service in accordance with an embodiment of the present invention. Each entity that constitutes one of the layers 200-206 may be embodied as an element 300. Each element 300 may define functions and interfaces used by the deployment automation module 116 to deploy and manage an entity represented by an element 300. An element 300 may be an entity that is a combination of sub-elements 300 and defines functions and interfaces for deploying and managing the combination of sub-elements 300. Accordingly, the deployment automation module 116 may invoke these interfaces and functions in order to deploy and manage an element without requiring any modification of the deployment automation module 116 to adapt to or have data describing the entity represented by the element 300.

For example, an element 300 may define functions and interfaces 302 for discovering the element such that once the element 300 is connected by a network to the deployment automation module 116, the element 300 may be discovered and its identity, type, and other attributes may be provided to the deployment automation module 116.

The element 300 may define functions and interfaces 304 for maintaining a reference to the element 300 in an inventory of elements 300 maintained by the deployment automation module 116. This may include responding to queries from the deployment automation module 116 with responses indicating availability of the element 300, e.g. whether it is assigned and operational.

The element 300 may define functions and interfaces 306 for performing life cycle management (LCM) of the element 300. This may include functions and interfaces for instantiating, upgrading, scaling, restarting, restarting, or de-instantiating the element 300.

The element 300 may define functions and interfaces 308 for performing healing the element 300. This may include functions and interfaces for detecting faults, recovering from faults, restoring non-functioning parts of the element 300, or other actions for restoring or maintaining function of the element 300.

The element 300 may define functions and interfaces for monitoring 310 health of the element 300. This may include functions and interfaces for running diagnostic checks, performance checks, or other evaluations of the state of operation of the element 300.

The element 300 may define functions and interfaces 312 for implementing policy with respect to the element 300. This may include functions and interfaces for receiving a policy for the element 300 and evaluating the policy with respect to a current state of operation of the element 300. The functions and interfaces 312 may define the policies themselves or may be configured to receive and implement policies received from the deployment automation module 116.

Figure 4:
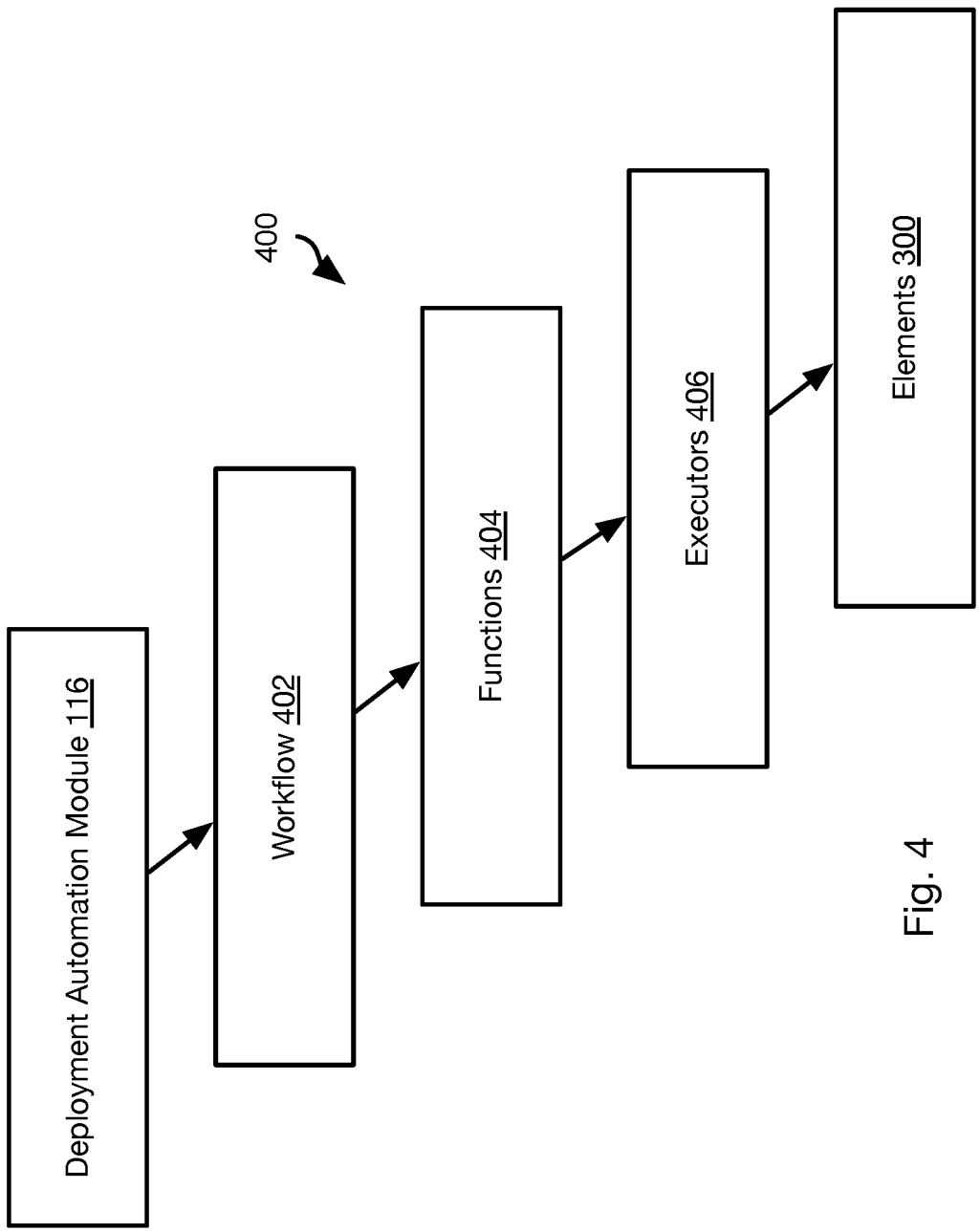
FIG. 4 is a schematic block diagram of a hierarchy for orchestrating a network service in accordance with an embodiment of the present invention.

FIG. 4 is a schematic block diagram of a hierarchy 400 for orchestrating a network service in accordance with an embodiment of the present invention. The deployment automation module 116 may ingest a workflow 402. The workflow defines a series of functions 404 and possibly an order of execution of the functions 404. The functions 404 may invoke executors 406 that operate with respect to an element 300. In particular, the functions 404 may be functions of instances of elements 300 included in the workflow 402. Accordingly, a workflow 402 may be define performance of functions 404 for specific elements 300 and possibly the ordering of these functions.

The elements 300 may be entities implementing a network service pipeline, radio area network (RAN), or any complex multi-application deployment and the workflow invokes the functions of these elements 300. As noted above, due to the abstraction of the elements 300, the workflow does not need to specify entity-specific functions. Instead tasks of a workflow 402 including discovery, inventory management, life cycle management, health monitoring, healing, policy implementation and other high-level functions may be invoked by invoking corresponding interfaces and functions 302-312 of the elements 300 of the workflow 402.

Figure 5:
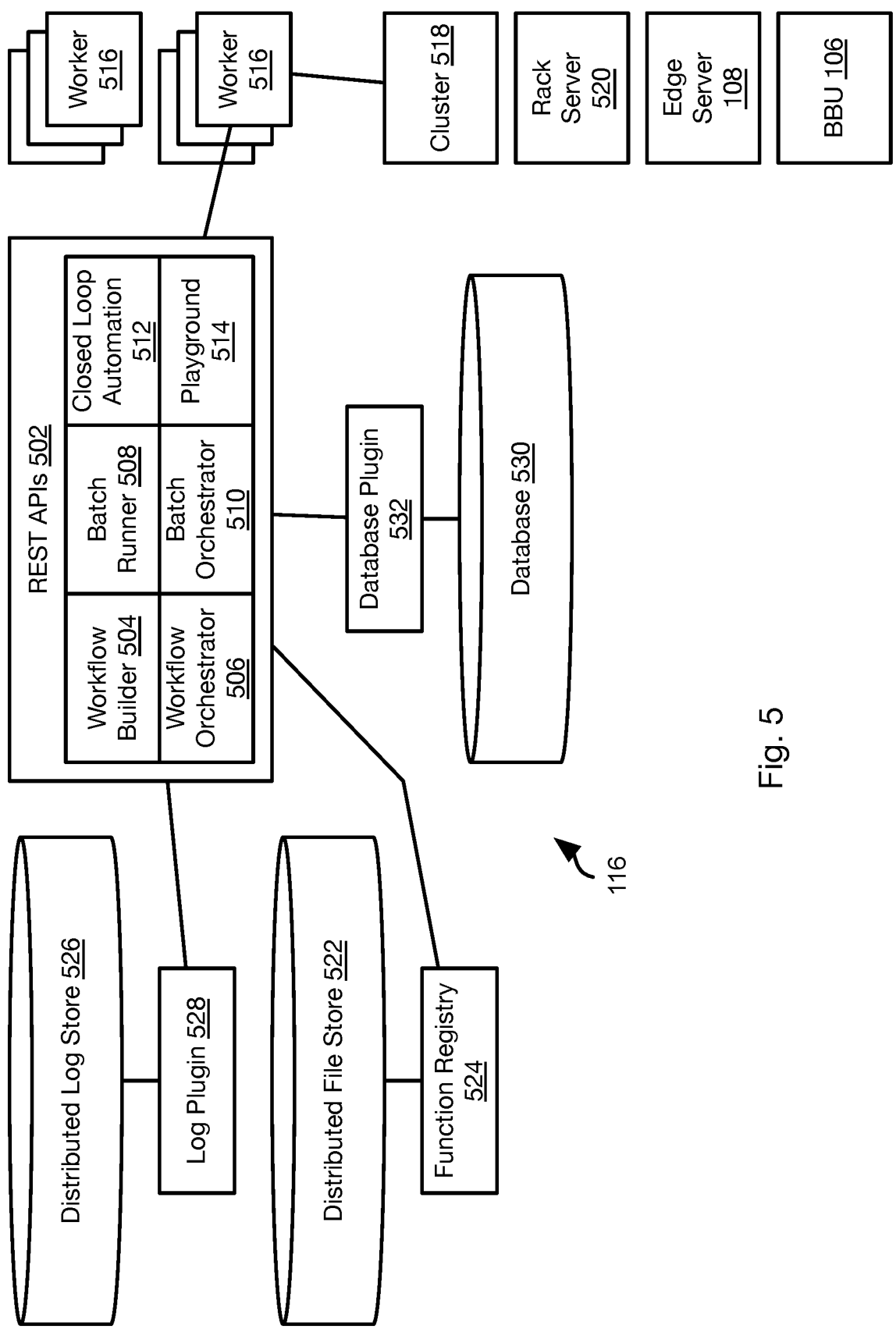
FIG. 5 is a schematic block diagram of APIs and databases for creating workflows implementing a network service in accordance with an embodiment of the present invention.

FIG. 5 is a schematic block diagram of a system for creating workflows implementing a network service in accordance with an embodiment of the present invention. In particular, the deployment automation module 116 may include or access some or all of the illustrated components.

The deployment automation module 116 may include application programming interfaces (APIs) 502, such as representational state transfer (REST) APIs, enabling a user to create and execute workflows 402. For example, a workflow builder 504 may define an interface enabling a user to create, select, and modify workflows 402 (see FIGS. 6 and 7). A workflow orchestrator 506 may implement the functions 404 of a workflow on the elements 300 of a workflow 402.

In many instances, the number of elements 300 and the functions 404 that are performed with respect to elements 300 is very large, on the order of 1000s or even millions. Accordingly, a batch runner 508 may set up batch processing of functions 404 for elements 300 and a batch orchestrator 510 may then execute the functions in batches as defined (see FIG. 9).

The APIs 502 may define closed loop automation 512 APIs that implement closed loop automation 212 of the deployment and management of the elements 300 of a workflow according to the interfaces 302-312 of the elements 300.

Figure 11:
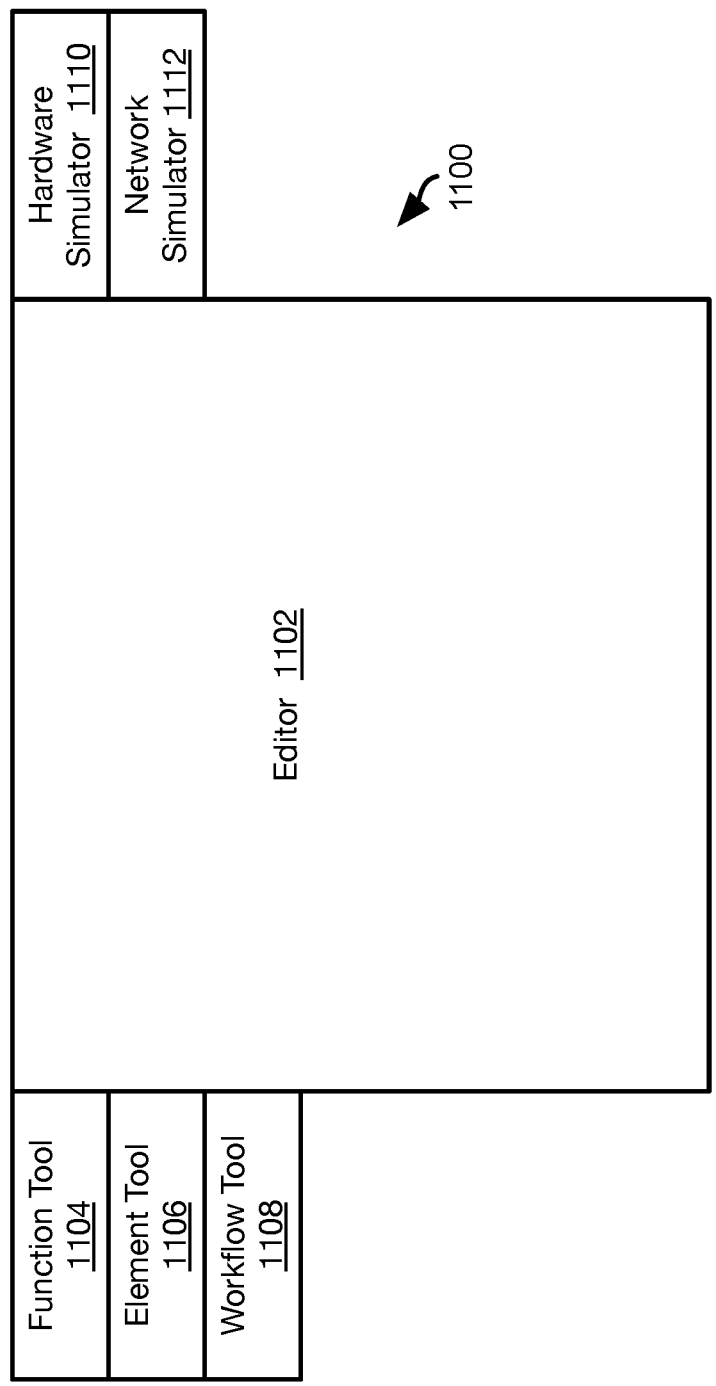
FIG. 11 is a schematic block diagram of a test platform for workflows and functions in accordance with an embodiment of the present invention.

A playground 514 may provide a testbed for the creation and evaluation of elements 300, workflows 402, and functions 404 (see FIG. 11).

Functions 404 of workflows 402, either individually or as parts of batches, may be implemented by workers 516. The workers 516 may be embodied as pods, such as pods according to the KUBERNETES orchestration platform. Alternatively, workers 516 may be processes or threads of execution executing on one or more computing devices of a network environment 100. For example, the workers 516 may execute on clusters 518, a rack server 520, edge server 108, BBU 106, or some other computing device.

The amount of files required to define the functions 404 and elements 300 of a workflow 402 may be very large. Accordingly a file store 522 may be implemented, such as in the form of a database accessed by means of a function registry 524 that maps a function 404 of an element 300 (e.g. a function identifier associated with an element identifier) to a storage location in the file store 522.

In a like manner, the number of files and amount of data generated by the functions 404 and applications instantiated by a workflow 402 may be very large. Accordingly, a distributed log store 526 may be implemented as a distributed database of log store to which functions 404 and applications instantiated by a workflow 402 may write updates too, such as by means of a log plugin 528.

Other data used by the APIs 502 may be stored in a database 530 accessed by means of a database plugin 532. For example, interfaces, templates, pre-defined workflows 402, elements 300, and other data that may be used by a user to define a workflow 404.

In some embodiments, each element 300 may have a state and a corresponding finite state machine that defines transitions between states of the finite state machine in response to events occurring involving the element 300. Accordingly, the REST APIs 502 may include a finite state machine manager 506 for managing the state machine of each instance of any of the elements 300.

Other REST APIs 536 may implement other functions, such as observability of elements (OBF), rule-based access control, cluster federation, and other functions that may facilitate implementation and management of a network service pipeline.

Figure 6:
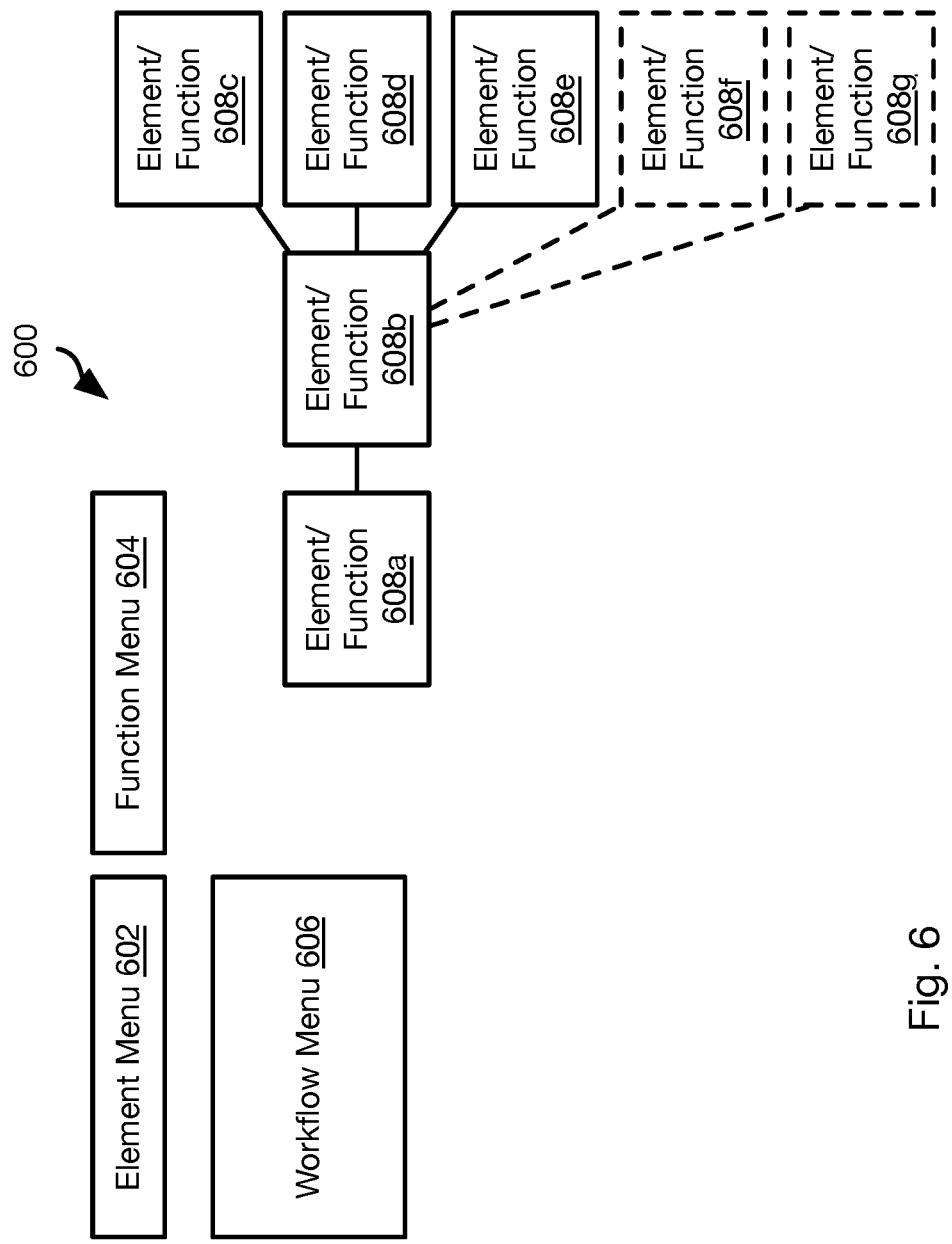
FIG. 6 is a schematic block diagram of an interface for creating workflows in accordance with an embodiment of the present invention.

FIG. 6 is a schematic block diagram of an interface 600 that may be provided by the workflow builder 504 to facilitate creating workflows 402 in accordance with an embodiment of the present invention. The interface 600 may include a menu 602 that enables a user to input a selection of an element 300 from a list of available elements 300. Elements 300 may include a virtual machine, a container, a database (e.g., MONGODB), an application, a router, a switch, a rack switch, relay, or any other element that may be needed to implement a network service. The interface may further include a function menu 604 that enables a user to input a selection of an element 300, e.g., the element selected using the menu 602. This may include any of the interfaces and functions 302-312 described above. For example, where a workflow 402 is to be created that instantiates a network pipeline, the functions selected from the menu 604 may be functions to instantiate the selected element. For example, an element/function (i.e., a selected function for a selected element type) 608a may define instantiating a primary manager of a cluster, element/function 608b may define instantiating a secondary manager of the cluster, element/functions 608c-608e may define instantiating one or more other nodes of the cluster. Other functions for a cluster may include acquiring licenses for software, performing network configuration of the managers and nodes of the cluster, acquiring IP addresses for the cluster and nodes of the cluster, setting up bundles (e.g., bundled applications), and setting up external backup depositories.

Each element/function 608a-608e input by a user may be represented by an icon on the graphical user interface (GUI) 600, such as shown in FIG. 6. Each element function 608a-608e may have configuration parameters such as internet protocol (IP) address, identifier, number of processing cores, amount of memory, amount of storage, etc., to be allocated to the node instantiated by the function 608a-608e. These parameters may be specified by default or may be input by a user, such as by accessing a menu permitting their input by clicking on a representation of a function 608a-608e in the interface 600.

A workflow 402 including any of the functions 404 for any of the elements 300 described herein may be created and configured in the same manner as for the example described above.

In some embodiments, predefined workflows 402 may be selected from a workflow menu 606. A user may then modify the workflow 402. For example, a workflow selected from the workflow menu 606 or created by a user may be modified to include additional element/functions 608f, 608g.

Figure 7:
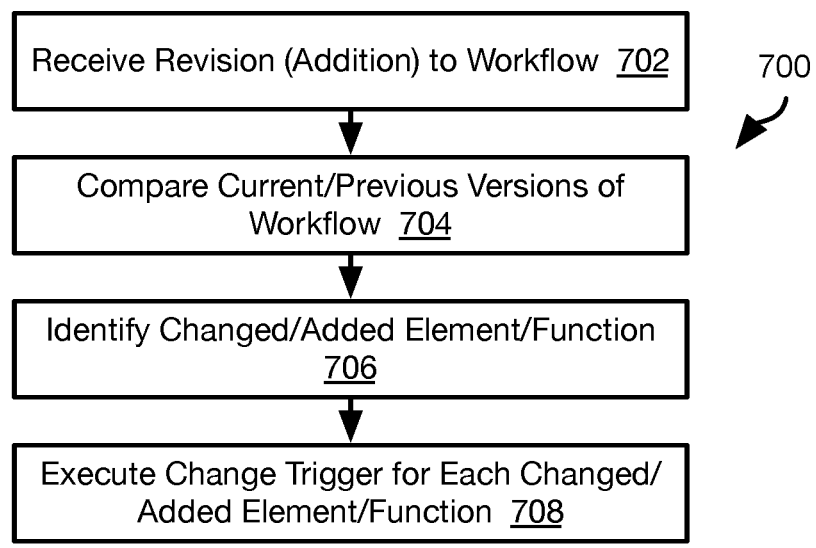
FIG. 7 is a process flow diagram of a method for dynamically modifying a workflow in accordance with an embodiment of the present invention.

Referring to FIG. 7, in some embodiments, workflows 402 may be defined dynamically such that aspects of the modification of the workflow 402 are automated. In particular, there may be many parameters that define a particular element/function 608a-608e. The method 700 may be executed by the workflow builder 504 to automatically reconfigure a workflow 402 in response to modification thereof. A workflow 402 may be implemented dynamically in terms of its structure and its functionality as described below. In particular, a workflow 402 may be modified according to a type of an element instance, and a size of an element instance. Some of the attributes e.g., size or health, of an element instance may be determined at runtime or change during runtime such that the workflow 402 may be dynamically changed according to triggers associated with the changed attributes as described below.

The method 700 may include receiving 702 a revision to a workflow 402, such as addition of one or more other element/functions 608f, 608g. These revisions may also include modifying the parameters of one or more existing element/functions 608a-608g of a workflow 402.

The method 700 may include comparing 704 the modified workflow to the previous version of the workflow and changed or added element/functions may be identified 706 according to the comparison. For example, when the user is done making changes and saves the modified workflow or otherwise invokes step 704, this comparison may be performed.

In some embodiments each element 300 may define triggers for each function thereof. Accordingly, when an element/function is added or a parameter thereof is modified, the trigger corresponding thereto may be executed 708 by the workflow builder 504. The trigger may define functions for dynamically modifying the workflow 402 in response to the modification or addition. For example, where a modification is the addition of an element/function, the trigger may define parameters for defining the new element/function in accordance with other instances of that element function 404 already in the workflow 402. For example, for a new cluster node, these automatically populated parameters may include an identifier, IP address, and relationship to a primary or secondary node of a cluster, or other nodes of the cluster. Triggers may likewise define modifications to other parameters of an element/function or the parameters of other element/functions of a workflow 402 when one of the parameters of the element/function is changed.

In this manner, the user is relieved of the burden of configuring each element/function of a workflow 402 when it is added. This enables a small set of predefined workflows 402 to be scaled and modified according to desires of a user using simple menu interactions and drag-and-drop interactions with icons representing the element/functions of a workflow 402.

Figure 8:
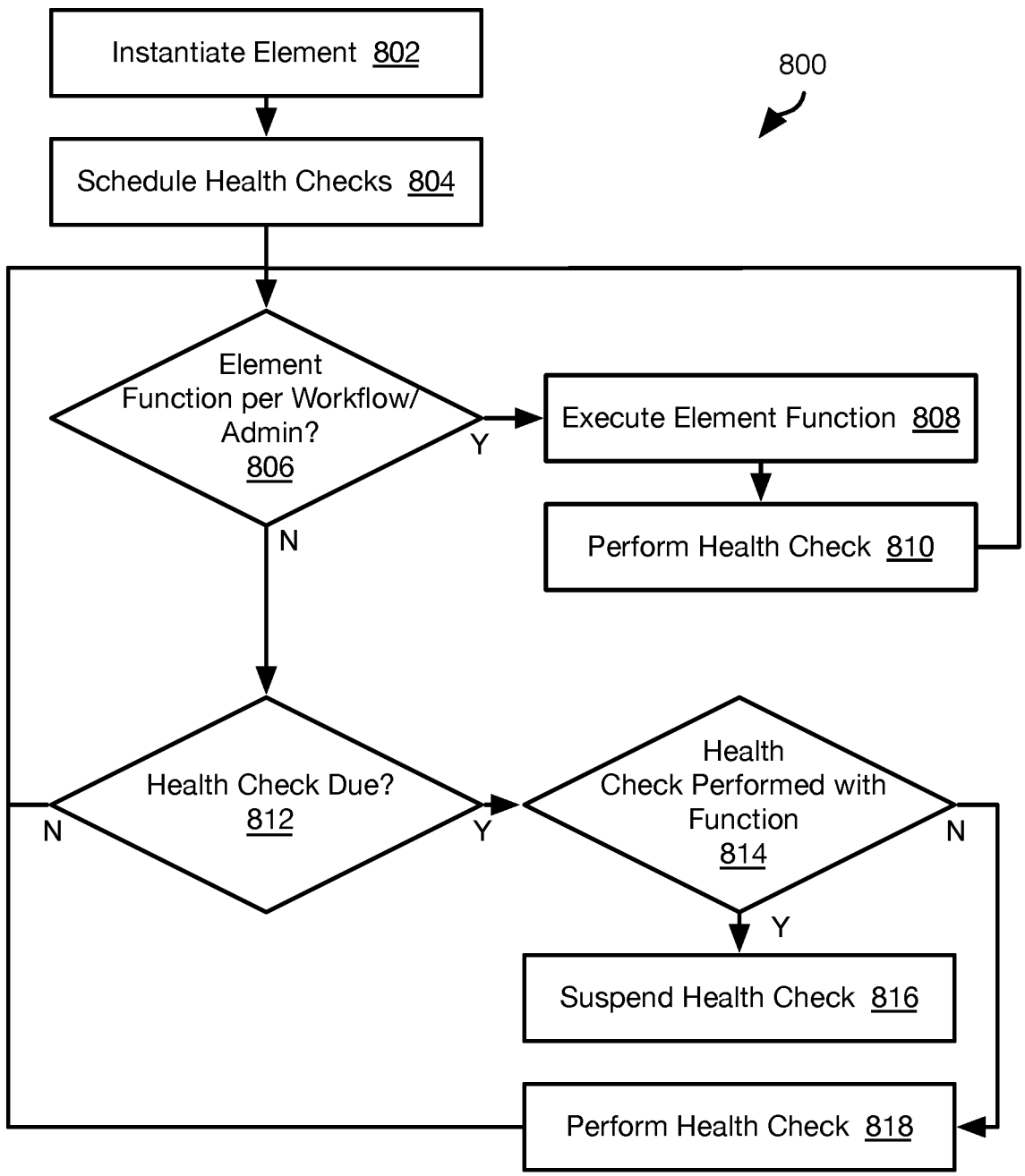
FIG. 8 is a process flow diagram of a method for performing health checks on an element in accordance with an embodiment of the present invention.

FIG. 8 is a process flow diagram of a method 800 for performing health checks on an element in accordance with an embodiment of the present invention. This may include executing the functions 310 for evaluating the health of the element 300 as described above with respect to FIG. 3. The health evaluations according to the functions 310 may be invoked by the deployment automation module 116 or by the element 300 itself following instantiation. The illustrated method 800 improves the efficiency of such health checks.

The method 800 may include instantiating 802 an element 300. The method 800 may further include scheduling 804 health checks. For example, the element 300 may itself be configured to invoke the health evaluation functions 310 at a predefined period. Alternatively, the deployment automation module 116 may schedule 804 performance of the health checks or instruct another element 300 to perform the health checks.

Following instantiation, various functions of an element 300 may be invoked, such as any of the LCM functions. In some embodiments, if a function of an element 300 is found 806 to be invoked on an instance of that element 300, that function is executed 808 and a health check is also performed 810 using the health evolution function for that instance of the element 300.

If a health check is found 812 to be due for the instance of the element 300, the method 800 may include evaluating 814 whether a health check was already performed, such as part of executing 808 another function at step 810. For example, if a health check performed with execution 808 of another function is performed within a threshold time period of a scheduled health check, the scheduled health check is suspended 816. For example, the threshold time period may be defined as a fraction of the period between scheduled health checks, e.g. from 5 to 25 percent.

If the evaluation of step 814 is negative (no health check following function execution within the threshold time period from the scheduled time), the health check is performed 818.

Figure 9:
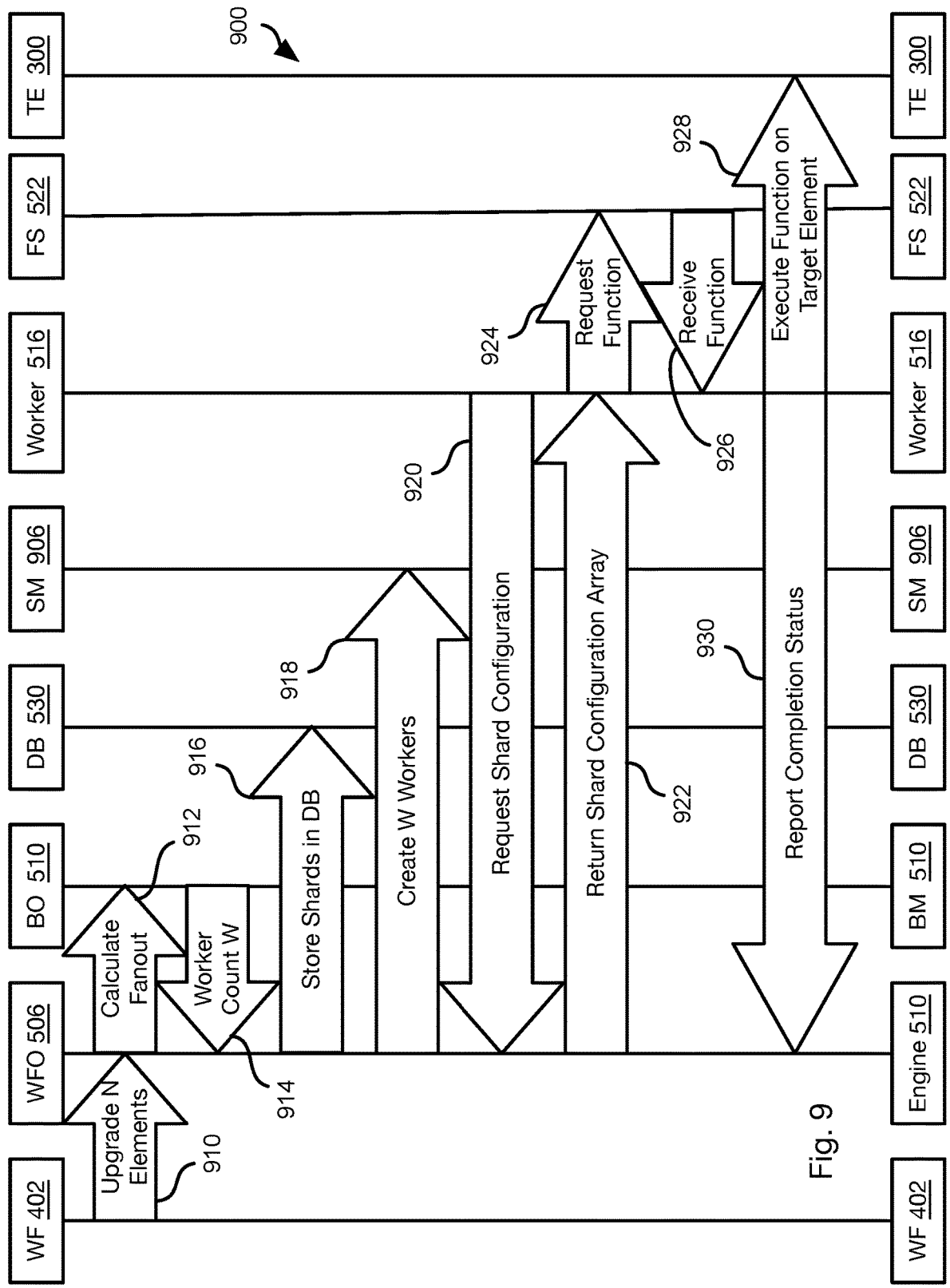
FIG. 9 is a process flow diagram of a method for batch processing functions for large numbers of elements in accordance with an embodiment of the present invention.

FIG. 9 is a process flow diagram of a method 900 for batch processing functions for large numbers of elements in accordance with an embodiment of the present invention. The method 900 may be performed by the deployment automation module (DAM) 116, such as using the workflow orchestrator (WFO) 506 batch orchestrator (BO) 510. Various other entities are involved in the method 900, including a workflow (WF) 402, the database (DB) 530, a spawning manager (SM) 906, worker 516, file store (FS) 522, and a plurality of target elements (TE) 300.

The method 900 may include receiving 910 an instruction to perform a function with respect to N elements 300. In the illustrated example, this function is upgrading, though any function ascribed herein to an element 300 may also be performed. In a typical application, N is very large, on the order of 1000s, 10,000s, or millions. The instruction 910 may be received from a user or received as part of processing a workflow 402.

The workflow orchestrator 506 receives the instruction and, in response, may calculate 912 fanout. This may include determining how many of the target elements 300 will be processed according to the function by a worker. The fanout may be static for all types of elements 300, defined for a particular type of element 300, defined for a particular function 302-312, defined for a particular function 302-312 of a particular type of element 300, or be determined based on some other criteria, which may be dynamic, such as a function of the value of N or current loading of workers 516 of the deployment automation module 116.

The batch orchestrator 510 may return 914 a worker count W that is a number of workers that are available to perform the function with respect to the N target elements 300. The work flow orchestrator 506 may then divide the N target elements 300 into shards such that each shard has approximately (e.g., +/−10) N/W elements 300 assigned to it. Each shard may include element identifiers of the target elements 300 assigned to it and may itself be assigned a shard identifier. The shards may be stored 916, such as in the database 530.

The workflow orchestrator 506 may then invoke 918 the creation of W workers. For example, a spawning module 906 may be programmed to generate workers 516 in response to receiving the instruction from step 918. Upon instantiation, the workers may each request 920 a shard from the workflow orchestrator 506, which may then return 922 a shard configuration array, e.g., an array of target element identifiers along with an identifier of the function to be performed with respect to the target elements 300 referenced by the target element identifiers.

The worker 516 may then request 924 the function, e.g. a script or executable, corresponding to the function identifier received at step 922, from the file store 522. The worker 516 then receives 926 the function and executes 928 the function on each of the target elements 300 reference in the shard configuration array received at step 922. Upon completion of execution of the function with respect to each target element 300 referenced by the shard, the worker 516 reports 930 completion to the workflow orchestrator 506. When all workers 516 complete processing of their shards, the instruction received at step 902 may be complete.

Figure 10:
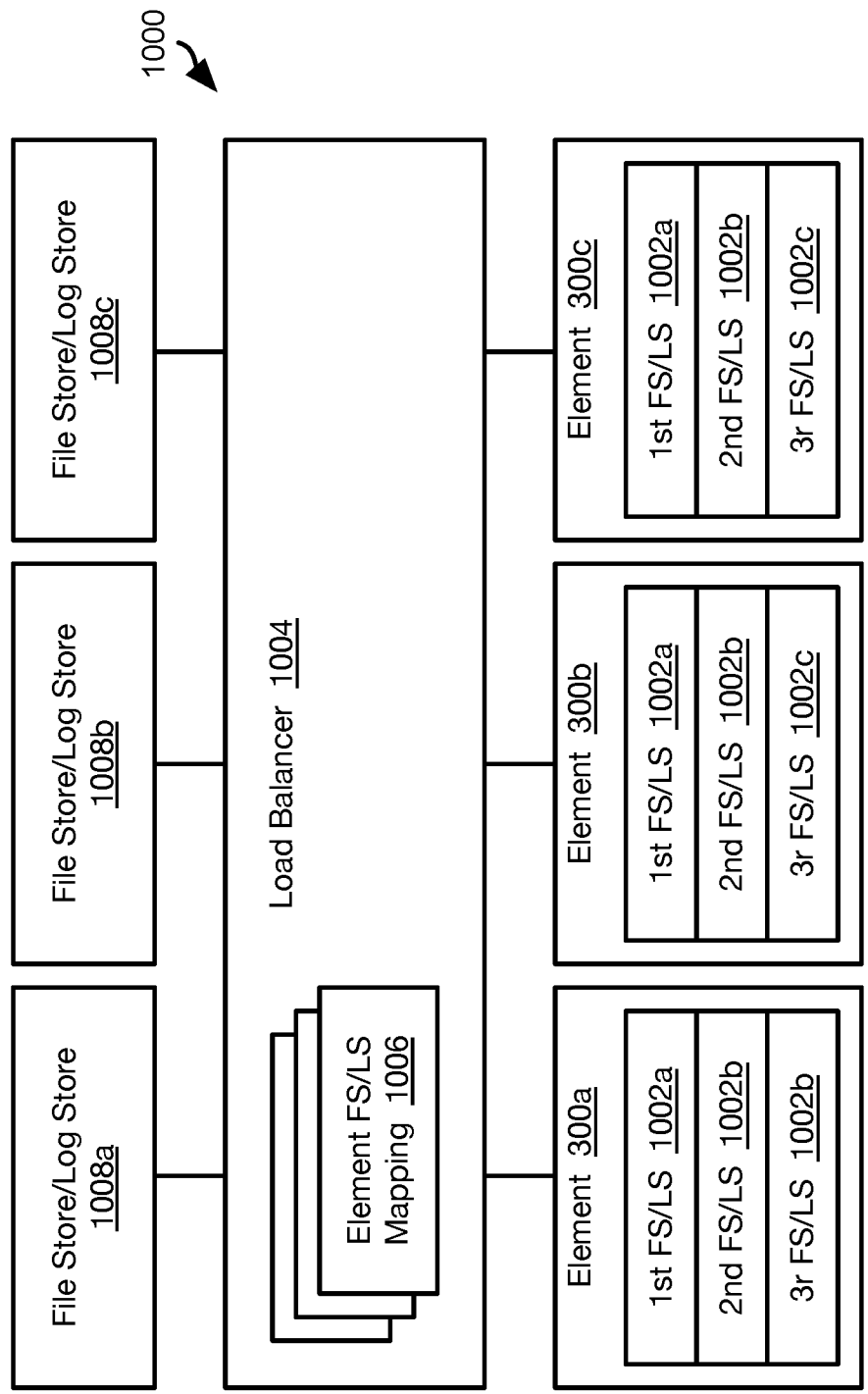
FIG. 10 is a schematic block diagram illustrating an approach for implementing file stores and log stores in accordance with an embodiment of the present invention.

FIG. 10 is a schematic block diagram illustrating an approach 1000 for implementing file stores 522 and log stores 526 in accordance with an embodiment of the present invention. In the foregoing description, the relationship of elements 300a, 300b, 300c is described with respect to reading from file stores 1008a, 1008b, 1008c. It shall be understood that writing to log stores may be distributed in a like manner.

Each element 300a, 300b, 300c may be configured with a list of file store identifiers 1002a, 1002b, 1002c indicating a primary file store, secondary file store, and a tertiary file store. Other numbers of file stores may be used with three being an example. Each element 300a, 300b, 300c will attempt to read from the file store referenced by its primary identifier 1002a, followed by attempting to read from that referenced by the secondary identifier 1002b if not successful, followed by attempting to read from that referenced by the tertiary identifier 1002c if not successful.

The file stores 1008a may be distributed. The computing devices of a network environment 100 may be distributed in different server racks, different buildings, different cities, or even different countries. Accordingly, the functions 302-312 of the elements 300 of a workflow 402 may be stored in copes distributed on various computing devices of the network environment, each copy being one of the file stores 1008a-1008c. Each element 300a-300c may therefore be configured to request files from a primary file store closest to it, with back up file stores referenced as secondary and tertiary where the primary file store is not available Requests to read from the file store 522 may be routed through a load balancer 1004. The load balancer 1004 may include mappings 1006 for each element 300a-300c, e.g. identifiers of the primary, secondary, and tertiary file stores 1002a-1002c. Accordingly, the load balancer 1004 may route request to read from the file store 522 according to a load balancing approach that prioritizes the primary file store of the requesting element 300a-300c as indicated in the mapping 1006 for the requesting element 300a-300c but may route to the secondary or tertiary file store, or possibly some other file store 1008a-1008c based on loading, e.g. if latency of the primary file store is high such that another file store 1008a-1008c may provide lower latency.

FIG. 11 is a schematic block diagram of a test platform 1100 for workflows and functions in accordance with an embodiment of the present invention. The test platform 1100 may include an editor 1102 that may be a word processor for inputting scripts or other computer code, a graphical user interface for assembly workflows (see FIG. 6), or other interface for creating functions, elements, workflows, or other executables. The test platform 1100 may include a tool 1104 for editing functions, a tool 1106 for editing elements, and a tool 1108 for editing workflows. Each tool 1104-1108 may include user interface elements enabling a user to create functions, elements, or workflows.

The platform 1100 may further include simulators. For example, a hardware simulator 1110 may simulate the function of a computing device, BBU, drone, or other hardware device. Accordingly, a function, element, or workflow that is defined for implementation for a hardware device may be simulated using the simulator 1110 for that hardware device. The test platform 1100 may further include a network simulator 1112 that simulates a network, e.g. network protocols, network latency, etc. Accordingly, a topology of elements 300 that are separate by a network may be tested by simulating execution on simulated hardware devices connected by a simulated network.

Once a function, element, or workflow created by a user has been created and tested, it may then be deployed by the deployment automation module 116 according to the systems and method described herein.

Figure 12:
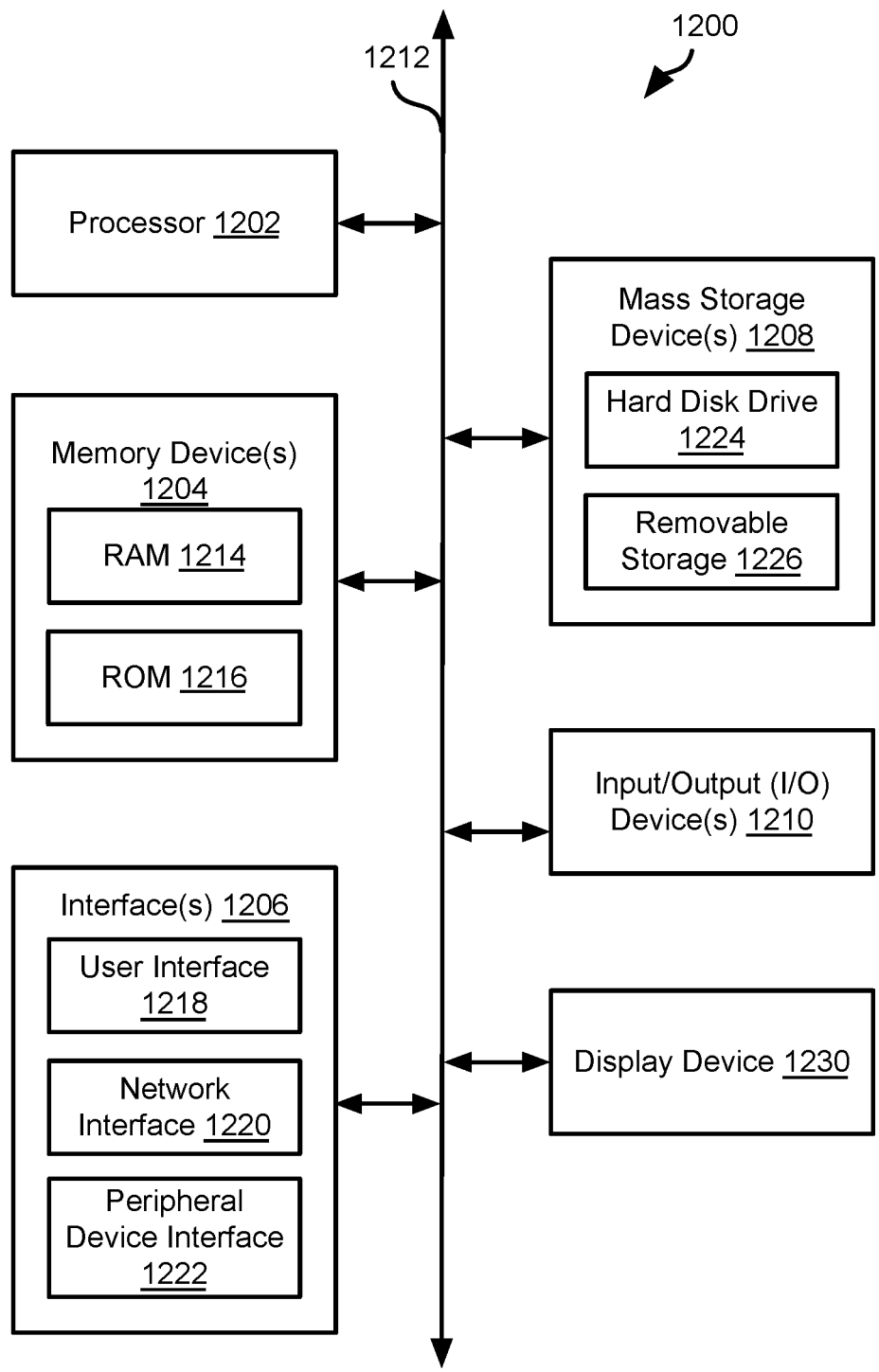
FIG. 12 is a schematic block diagram of an example computing device suitable for implementing methods in accordance with embodiments of the invention.

FIG. 12 is a block diagram illustrating an example computing device 1200. Computing device 1200 may be used to perform various procedures, such as those discussed herein.

Computing device 1200 includes one or more processor(s) 1202, one or more memory device(s) 1204, one or more interface(s) 1206, one or more mass storage device(s) 1208, one or more Input/output (I/O) device(s) 1210, and a display device 1230 all of which are coupled to a bus 1212. Processor(s) 1202 include one or more processors or controllers that execute instructions stored in memory device(s) 1204 and/or mass storage device(s) 1208. Processor(s) 1202 may also include various types of computer-readable media, such as cache memory.

Memory device(s) 1204 include various computer-readable media, such as volatile memory (e.g., random access memory (RAM) 1214) and/or nonvolatile memory (e.g., read-only memory (ROM) 1216). Memory device(s) 1204 may also include rewritable ROM, such as Flash memory.

Mass storage device(s) 1208 include various computer readable media, such as magnetic tapes, magnetic disks, optical disks, solid-state memory (e.g., Flash memory), and so forth. As shown in FIG. 12, a particular mass storage device is a hard disk drive 1224. Various drives may also be included in mass storage device(s) 1208 to enable reading from and/or writing to the various computer readable media. Mass storage device(s) 1208 include removable media 1226 and/or non-removable media.

I/O device(s) 1210 include various devices that allow data and/or other information to be input to or retrieved from computing device 1200. Example I/O device(s) 1210 include cursor control devices, keyboards, keypads, microphones, monitors or other display devices, speakers, printers, network interface cards, modems, lenses, CCDs or other image capture devices, and the like.

Display device 1230 includes any type of device capable of displaying information to one or more users of computing device 1200. Examples of display device 1230 include a monitor, display terminal, video projection device, and the like.

Interface(s) 1206 include various interfaces that allow computing device 1200 to interact with other systems, devices, or computing environments. Example interface(s) 1206 include any number of different network interfaces 1220, such as interfaces to local area networks (LANs), wide area networks (WANs), wireless networks, and the Internet. Other interface(s) include user interface 1218 and peripheral device interface 1222. The interface(s) 1206 may also include one or more peripheral interfaces such as interfaces for printers, pointing devices (mice, track pad, etc.), keyboards, and the like.

Bus 1212 allows processor(s) 1202, memory device(s) 1204, interface(s) 1206, mass storage device(s) 1208, I/O device(s) 1210, and display device 1230 to communicate with one another, as well as other devices or components coupled to bus 1212. Bus 1212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1200, and are executed by processor(s) 1202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
   instantiating, by a server system in a network environment, element instances of a plurality of elements according to a workflow comprising functions of the plurality of elements, each element of the plurality of elements defining a set of functions for deployment of an entity associated with the each element, the entity associated with each element of the plurality of elements being one of a virtual machine, container, database, and a network service;
   managing, by the server system, the element instances according to the functions of the plurality of elements; and
   invoking, by the server system, a health check of each element instance of the element instances following execution of each function of the functions of the plurality of elements.

2. The method of claim 1, wherein invoking the health check of each element instance comprises executing a health check function of the functions of the each element instance.

3. The method of claim 2, wherein the health check function of the functions of the each element instance performs any of:
   a diagnostic check, a performance check, and an evaluations of a state of operation of an instance of the each element instance.

4. The method of claim 1, wherein managing, by the server system, the element instances according to the functions of the plurality of elements comprises executing functions of the element instances performing any of upgrading and repairing the element instances.

5. The method of claim 1, further comprising processing, by the server system, the functions of the workflow with respect to the network environment to instantiate a network service pipeline in the network environment including the element instances of the plurality of elements.

6. The method of claim 1, further comprising, for each element instance of the element instances:
   executing a function of the each element instance following instantiation of the each element instance; and
   performing the health check on the each element instance in response to executing of the function of the each element instance.

7. The method of claim 6, further comprising, for each element instance of the element instances:
   scheduling periodic health checks of the each element instance at predefined intervals;
   determining that a function of the each element instance was executed within a threshold time from a scheduled time of execution of a periodic health check of the periodic health checks of the each element instance; and
   in response to determining that the function of the each element instance was executed within the threshold time from the scheduled time of execution of the periodic health check, suspending the periodic health check.

8. The method of claim 1, further comprising:
   retrieving executable code defining the functions of the plurality of elements from a distributed file store.

9. The method of claim 1, wherein the functions of the plurality of elements include any of:
   life cycle management functions;
   inventory management functions;
   discovery facilitating functions;
   health check functions;
   healing functions; and
   policy implementation functions.

10. A non-transitory computer-readable medium storing executable code that, when executed by a processing device, causes the processing device to:
   instantiate, in a network environment, element instances of a plurality of elements according to a workflow comprising functions of the plurality of elements, each element of the plurality of elements defining a set of functions for deployment of an entity associated with the each element, the entity associated with each element of the plurality of elements being one of a virtual machine, container, database, and a network service;
   manage the element instances according to the functions of the plurality of elements; and
   invoke a health check of each element instance of the element instances following execution of each function of the functions of the plurality of elements.

11. The non-transitory computer-readable medium of claim 10, wherein the executable code, when executed by the processing device, further causes the processing device to:

invoke the health check of each element instance by executing a health check function of the functions of the each element instance.

12. The non-transitory computer-readable medium of claim 11, wherein the health check function of the functions of the each element instance performs any of:

a diagnostic check, a performance check, and an evaluations of a state of operation of an instance of the each element instance.

13. The non-transitory computer-readable medium of claim 10, wherein the executable code, when executed by the processing device, further causes the processing device to:

manage the element instances according to the functions of the plurality of elements by executing functions of the element instances performing any of upgrading and repairing the element instances.

14. The non-transitory computer-readable medium of claim 10, wherein the executable code, when executed by the processing device, further causes the processing device to:

process the functions of the workflow with respect to the network environment to instantiate a network service pipeline in the network environment including the element instances of the plurality of elements.

15. The non-transitory computer-readable medium of claim 14, wherein the executable code, when executed by the processing device, further causes the processing device to, for each element instance of the element instances:

execute a function of the each element instance following instantiation of the each element instance; and perform the health check on the each instance in response to executing of the function of the each element instance.

16. The non-transitory computer-readable medium of claim 15, wherein the executable code, when executed by the processing device, further causes the processing device to, for each element instance of the element instances:

schedule periodic health checks of the each element instance at predefined intervals;

determine that a function of the each element instance was executed within a threshold time from a scheduled time of execution of a periodic health check of the periodic health checks; and in response to determining that the function of the each element instance was executed within the threshold time from the scheduled time of execution of the periodic health check, suspend the periodic health check.

17. The non-transitory computer-readable medium of claim 10, wherein the executable code, when executed by the processing device, further causes the processing device to:

retrieve executable code defining the functions of the plurality of elements from a distributed file store.

18. The non-transitory computer-readable medium of claim 10, wherein the functions of the plurality of elements include any of:

life cycle management functions;
inventory management functions;
discovery facilitating functions;
health check functions;
healing functions; and
policy implementation functions.

19. A method comprising:

instantiating, in a network environment, element instances of a plurality of elements according to a workflow comprising functions of the plurality of elements, each element of the plurality of elements defining a set of functions for deployment of an entity associated with the each element, the entity associated with each element of the plurality of elements being one of a virtual machine, container, database, and a network service;

performing a health check of each element instance in response to executing of a function of the set of functions of each element instance;

scheduling periodic health checks of each element instance at predefined intervals; and when the function of each element instance was executed within a threshold time from a scheduled time of execution of a periodic health check of the periodic health checks of each element instance, suspending the periodic health check.

20. The method of claim 19, wherein:

invoking the health check of each element instance comprises executing a health check function of the functions of the each element instance; and wherein the health check function of the functions of each element instance performs any of a diagnostic check, a performance check, and an evaluations of a state of operation of an instance of each element instance.

* * * * *